(12) United States Patent
Partyka et al.

(10) Patent No.: US 11,891,112 B2
(45) Date of Patent: Feb. 6, 2024

(54) INTERMEDIATE SHAFT AXIAL RETENTION DEVICE

(71) Applicant: Steering Solutions IP Holding Corporation, Saginaw, MI (US)

(72) Inventors: Michael E. Partyka, Saginaw, MI (US); Daniel P. Cook, Saginaw, MI (US); Terry E. Burkhard, Bay City, MI (US); David E. Moore, Grand Blanc, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 127 days.

(21) Appl. No.: 17/361,745

(22) Filed: Jun. 29, 2021

(65) Prior Publication Data
US 2021/0403075 A1 Dec. 30, 2021

Related U.S. Application Data

(60) Provisional application No. 63/046,177, filed on Jun. 30, 2020.

(51) Int. Cl.
*B62D 1/185* (2006.01)
*F16C 3/03* (2006.01)

(52) U.S. Cl.
CPC ............. *B62D 1/185* (2013.01); *F16C 3/03* (2013.01); *F16C 2220/04* (2013.01); *F16C 2220/44* (2013.01); *F16C 2326/24* (2013.01)

(58) Field of Classification Search
CPC .. B62D 1/185; B62D 1/16; B62D 1/20; F16C 3/03; F16C 2220/04; F16C 2220/44;
(Continued)

(56) References Cited

U.S. PATENT DOCUMENTS 6,402,197 B1 *  6/2002  Kim .................... B62D 1/16
    280/779
8,419,555 B2 *  4/2013  Tokioka ............... B62D 1/185
    29/434

(Continued)

FOREIGN PATENT DOCUMENTS

JP    2011117496 A   6/2011
JP    2012051384 A   3/2012

OTHER PUBLICATIONS

English translation of Office Action regarding corresponding DE App. No. 10 2021 116 733.7; dated Apr. 7, 2022.

*Primary Examiner* — Paul N Dickson
*Assistant Examiner* — Shams Dhanani
(74) *Attorney, Agent, or Firm* — Dickinson Wright PLLC

(57) ABSTRACT

A steering shaft assembly includes a male shaft having a plurality of teeth extending radially outwardly from a portion of the male shaft. The steering shaft assembly also includes a female shaft receiving a portion of the male shaft and fixed to the male shaft in a rotational direction, the male shaft axially moveable relative to the female shaft, the female shaft having an end portion and a body portion, wherein the end portion of the female shaft has an end wall thickness that is less than a body wall thickness of the body portion, the end portion curved radially inwardly to define a hard stop position during axial movement of the male shaft. An end of the plurality of teeth of the male shaft contact the curved end portion of the female shaft at the hard stop position.

8 Claims, 4 Drawing Sheets

(58) Field of Classification Search
CPC ...... F16C 2326/24; F16C 41/001; F16D 3/06; Y10T 403/32475
See application file for complete search history.

(56) References Cited

U.S. PATENT DOCUMENTS

| | | | |
|---|---|---|---|
| 11,092,190 B2* | 8/2021 | Märk | F16C 3/03 |
| 2004/0152528 A1* | 8/2004 | Okude | F16C 27/066 |
| | | | 464/182 |
| 2012/0193901 A1* | 8/2012 | Jouta | B62D 7/224 |
| | | | 280/775 |
| 2014/0200086 A1* | 7/2014 | Kurokawa | B62D 1/20 |
| | | | 464/162 |
| 2019/0195271 A1* | 6/2019 | Breuer | F16C 3/03 |
| 2020/0122769 A1* | 4/2020 | Durot | F16D 3/38 |

\* cited by examiner

INTERMEDIATE SHAFT AXIAL RETENTION DEVICE

CROSS-REFERENCE TO RELATED APPLICATION

This patent application claims the benefits of priority to U.S. Provisional Patent Application Ser. No. 63/046,177, filed Jun. 30, 2020, the disclosure of which is incorporated by reference herein in its entirety.

FIELD OF THE INVENTION

The present disclosure relates to vehicle steering systems and, more particularly, to an intermediate shaft axial retention assembly for steering systems, as well as methods of making and assembling such an assembly.

BACKGROUND

Vehicle steering systems include a steering shaft assembly that couples a handwheel to one or more components that facilitate steering control of a vehicle. The steering shaft assembly often includes multiple shafts, with one being referred to as an intermediate shaft.

One of the characteristics of an intermediate shaft is its ability to transfer torque and provide axial displacement without the possibility of becoming separated. To achieve transference of torque with a high torsional rate, all slip joint shaft designs require a line-to-line tight fit while still maintaining a low stroke load. Currently stakes are used to retain a male shaft inside a female tube to prevent the two shafts from becoming detached during shipping, handling and assembly in a vehicle. Recently, some vehicle suppliers and manufacturers have increased the stake pull apart requirements due to assembly requirements. For example, the stakes may be required to hold 2.5 times the mass of the column with less than a 60 N breakaway load. In in another example, the stakes may be required to hold 1000 N for 20 seconds with less than a 40 N breakaway load when collapsed from full extension. For ergonomic requirements during in vehicle assembly, no sticking or high stroke loads are allowed which could result in a no build situation. With current stake processes, a slip joint will lock up when pushed in from full extension exceeding the breakaway collapse requirement.

SUMMARY

According to one aspect of the disclosure, a steering shaft assembly includes a male shaft having a plurality of teeth extending radially outwardly from a portion of the male shaft. The steering shaft assembly also includes a female shaft receiving a portion of the male shaft and fixed to the male shaft in a rotational direction, the male shaft axially moveable relative to the female shaft, the female shaft having an end portion and a body portion, wherein the end portion of the female shaft has an end wall thickness that is less than a body wall thickness of the body portion, the end portion curved radially inwardly to define a hard stop position during axial movement of the male shaft. The teeth are overmolded with a plastic material, an end of the overmolded plastic material at an end of the plurality of teeth of the male shaft contacting the curved end portion of the female shaft at the hard stop position.

According to another aspect of the disclosure, a steering shaft assembly includes a male shaft having a plurality of teeth extending radially outwardly from a portion of the male shaft. The steering shaft assembly also includes a female shaft receiving a portion of the male shaft and fixed to the male shaft in a rotational direction, the male shaft axially moveable relative to the female shaft, the female shaft having an end portion and a body portion, wherein the end portion of the female shaft has an end wall thickness that is less than a body wall thickness of the body portion, the end portion curved radially inwardly to define a hard stop position during axial movement of the male shaft. An end of the plurality of teeth are non-overmolded with a plastic material, an end of the plurality of teeth of the male shaft contacting the curved end portion of the female shaft at the hard stop position.

According to yet another aspect of the disclosure, a steering shaft assembly includes a male shaft having a plurality of teeth extending radially outwardly from a portion of the male shaft. The steering shaft assembly also includes a female shaft receiving a portion of the male shaft and fixed to the male shaft in a rotational direction, the male shaft axially moveable relative to the female shaft, the female shaft defining a groove within an inner wall of the female shaft. The steering shaft assembly further includes a metal ring disposed within the groove of the female shaft and protruding radially inwardly to define a hard stop position during axial movement of the male shaft. The steering shaft assembly yet further includes an end of the plurality of teeth of the male shaft contacting the metal ring at the hard stop position.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, a retention feature for a vehicle steering shaft assembly is illustrated.

Figure 1:
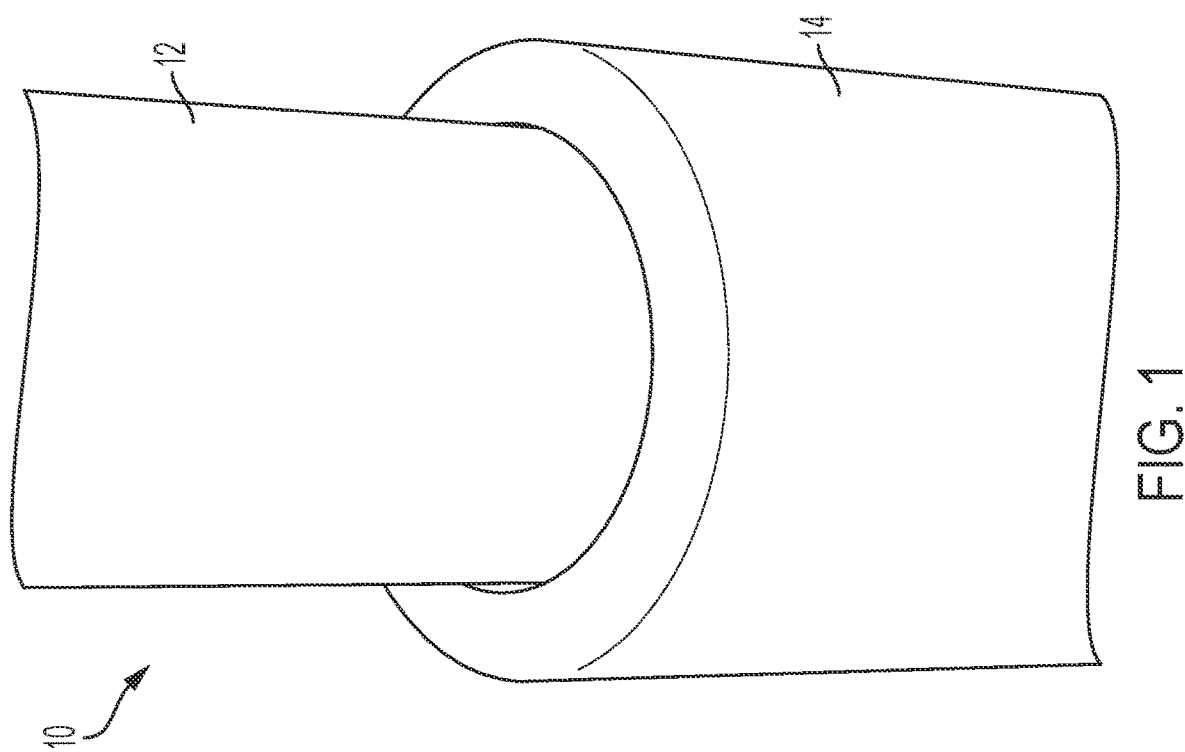
FIG. 1 is a perspective view of a steering shaft assembly.

Referring to FIG. 1, a vehicle steering shaft assembly is partially shown and generally referenced with numeral 10. The shaft assembly 10 includes, in part, a male shaft 12 and a female shaft 14. The male shaft 12 is inserted partially within the female shaft 14 and the shafts 12, 14 are configured to axially displace relative to each other. The vehicle steering shaft assembly 10 may be used in a steering system of any suitable type of vehicle. For example, a steering system in a car, a truck, a sport utility vehicle, a mini-van, a crossover, any other passenger vehicle, any suitable commercial vehicle, or any other suitable vehicle may benefit from the embodiments disclosed herein. Moreover, principles of the present disclosure may apply to other vehicles, such as planes, boats, trains, drones, or other suitable vehicles. Furthermore, the present invention may be incorporated into various steering system schemes and electric power steering (EPS) systems.

Figure 2:
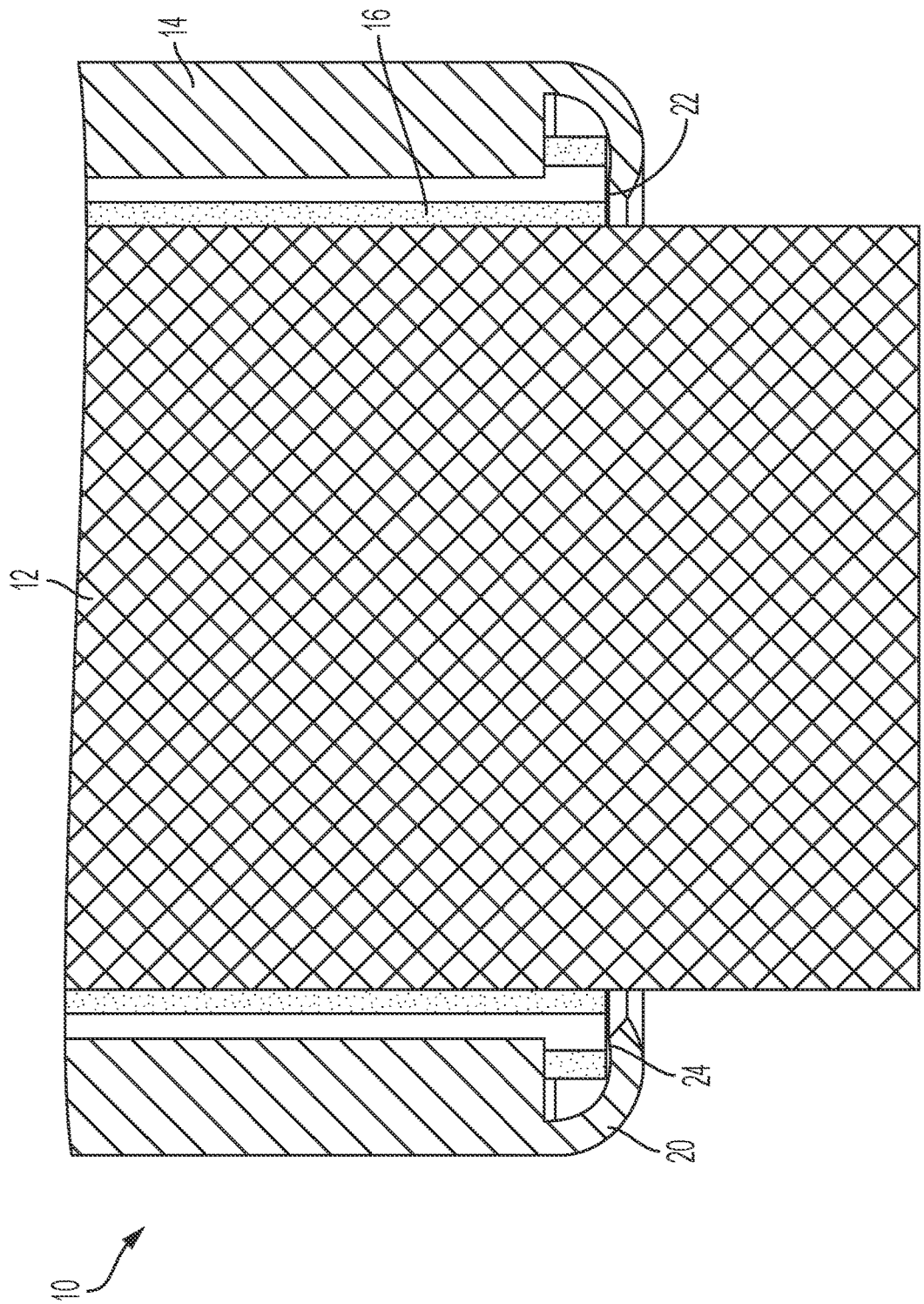
FIG. 2 is a cross-sectional view of a portion of the steering shaft assembly.
Figure 3:
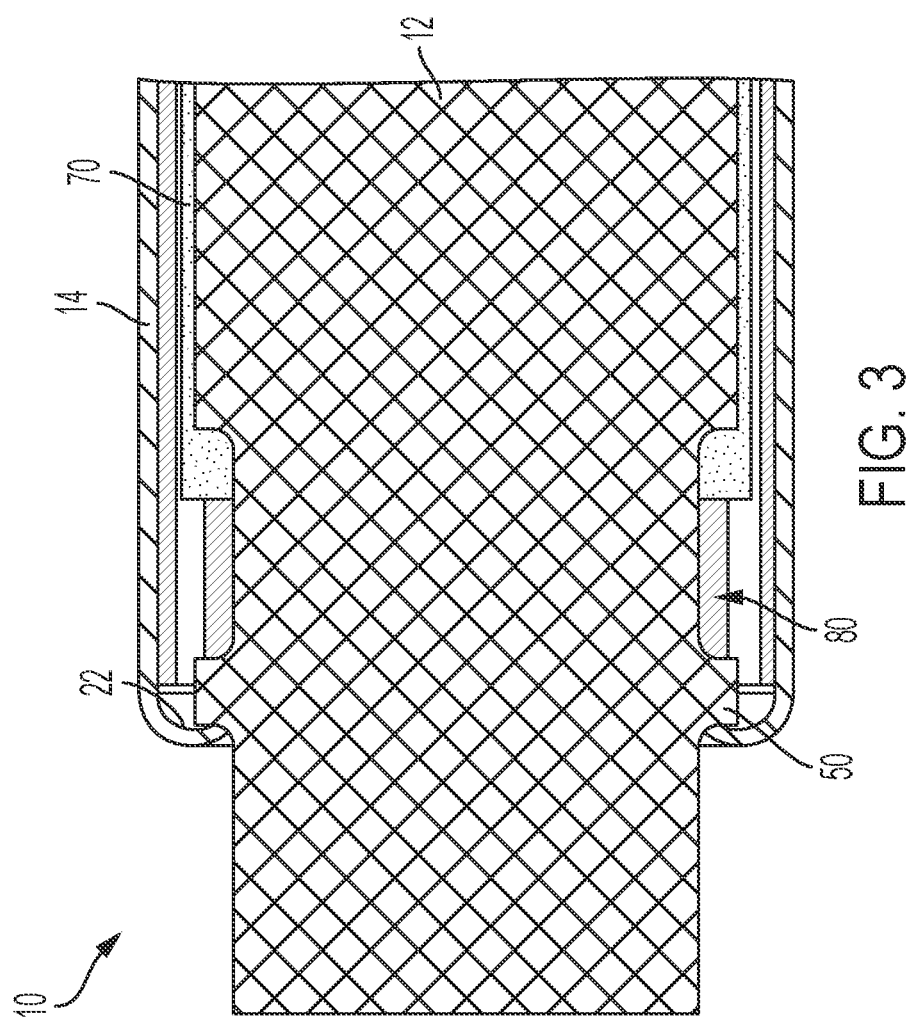
FIG. 3 is a cross-sectional view of a portion of the steering shaft assembly according to another aspect of the disclosure.
Figure 4:
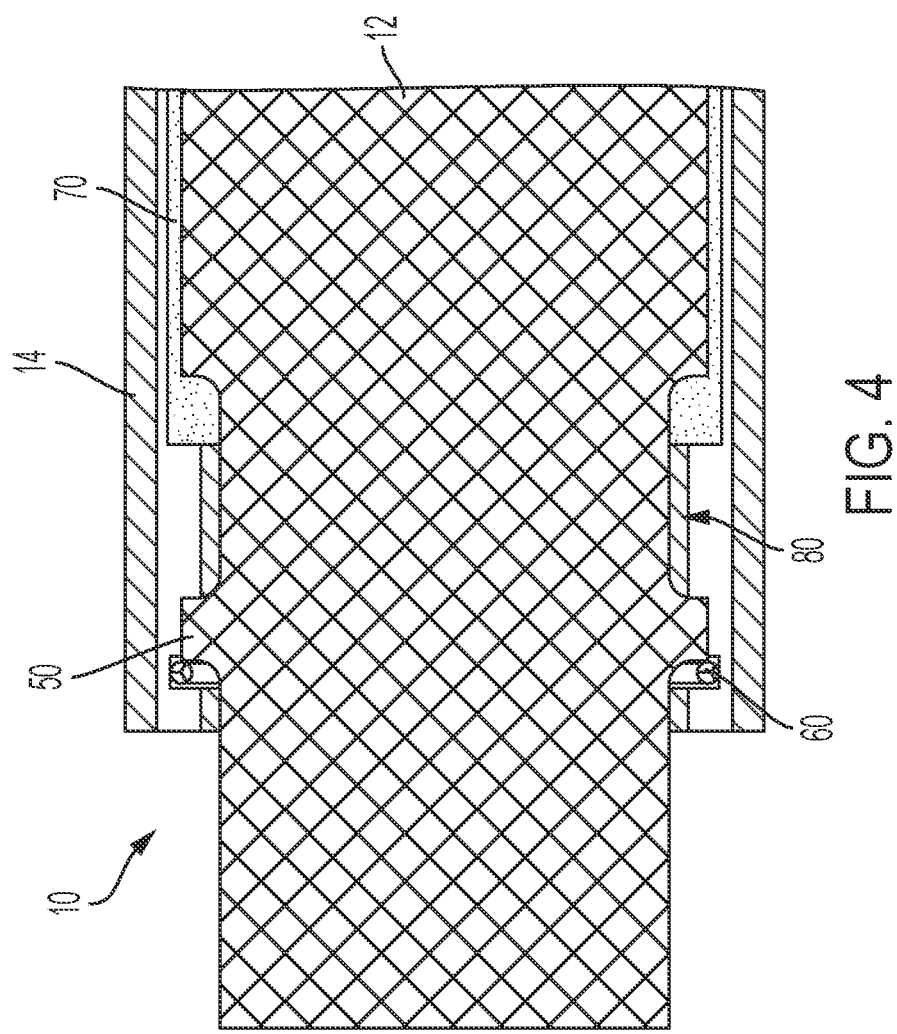
FIG. 4 is a cross-sectional view of a portion of the steering shaft assembly according to another aspect of the disclosure.

FIGS. 2 and 3 illustrate various embodiments which each provide a consistent stake in the female shaft 14. FIG. 4 illustrates the use of a ring groove and snap wire in the female shaft 14. The counter-bore design, and stake tool profile provides consistent press loads with no risk of contact with the inner shaft, which could cause noise and/or high sliding load. The assembly provides a high load carrying capability. The evenly distributed tooth contact provides a positive hard stop with no possibility of becoming locked up in the female shaft 14 at full extension. Increased stake tool life is also achieved, as the thinner tube thickness results in reduced tool wear. Finally, with the counter-bore feature of this design there is no deformation of female shaft spline.

Referring now to FIG. 2, an overlapping region of the male shaft 12 and the female shaft 14 is shown in greater detail. As shown, the male shaft 12 and the female shaft 14 are rotationally coupled to each other with a plurality of teeth 16, which interlock with each other. These may be referred to as splines. In particular, the male shaft 12 includes a plurality of radially extending teeth protruding outwardly from the male shaft 12 and are fitted within grooves or the like defined within the inner wall of the female shaft 14. The fitted relationship of these components prevents relative rotation of the male shaft 12 and the female shaft 14, such that rotation of one results in rotation of the other.

The male shaft 12 and the female shaft 14 are axially adjustable relative to each other via sliding movement of the male shaft 12 relative to the female shaft 14. The female shaft 14 includes an end 20 that is deformed to axially retain the male shaft 12 therein. In particular, a region at the end 20 of the female shaft 14 is manufactured to be thinner than the adjacent portion—e.g., body—of the female shaft 14. The thinner end region may have any thickness and length suitable for a particular application of use. The end region is axially deformed to curve the end region and provide a hard stop that is engaged by a portion of the male shaft 12 once the male shaft 12 is axially translated to a specified position. This is done with a rolling manufacturing process or any suitable alternative. The curvature of the end portion of the female shaft may result in a portion of the end portion being substantially perpendicular relative to the body portion of the female shaft 14 in some embodiments, but other angles are also contemplated, such as the illustrated orientation where the end 20 is curved beyond perpendicular to form an acute angle with the body portion of the female shaft 14.

In the illustrated embodiment, the splines/teeth of the male shaft 12 are overmolded to the outer diameter of the male shaft 12. These splines/teeth are formed of plastic. An end of the overmolded teeth of the male shaft 12 engages the axial retention feature 22 of the female shaft 14. In such an embodiment, the end 24 of the teeth engages the axial retention feature 22 at a desired axial position to retain the male shaft 12 within the female shaft 14. The embodiment of FIG. 2 is suitable for applications up to certain required load requirements.

Referring to FIGS. 3 and 4, additional embodiments of the shaft assembly 10 are illustrated. In contrast to the embodiments of FIG. 2, where a plastic to metal hard stop is disclosed, the embodiments of FIGS. 3 and 4 provide a metal-to-metal contact for the hard stop between the male shaft 12 and the female shaft 14.

The embodiments of FIGS. 3 and 4 eliminate high breakaway forces and high running loads that may occur when plastic on the male overmolded shaft contacts the stake profile on the female tube. In the disclosed embodiments, the male shaft 12 includes a portion of the splines to be non-overmolded outside of the molded section. This portion is shown in FIGS. 3 and 4 and is referenced with numeral 50.

In FIG. 3, this allows the non-overmolded, metal spline portion 50 on the male shaft 12 to come in contact with the staked portion 22 of the female shaft 14 to provide a hard stop for the male shaft 12.

In FIG. 4, the non-overmolded, metal spline portion 50 of the male shaft 12 comes into contact with a metal ring 60 that is disposed within a groove defined by the inner wall of the female shaft 14. This contact provides a hard stop for the male shaft 12.

FIGS. 3 and 4 each include a portion of the plurality of teeth 16 of the male shaft 12 which are overmolded with a plastic material, as referenced by numeral 70. The non-overmolded portion 50 and the overmolded portion 70 of the plurality of teeth 16 are separated by a tooth recess 80 in some embodiments.

The hard stop contact of FIGS. 3 and 4 are metal-to-metal, thereby avoiding deformation of plastic. Any deformation of plastic beyond the tooth form causes high breakaway forces and increased running loads. The higher the load against the stake, the more the plastic is deformed in any design with plastic at the interface. A line-to-line fit is required in all slip joint shaft designs to give a high torsional rate with low stroke loads. For ergonomic requirements during vehicle assembly, no sticking or high stroke loads are allowed which could result in a no build situation. The embodiments disclosed herein allow the sliding joint to withstand high pull apart forces without an increase in the breakaway load or the running load. This anti-pull apart feature provides a positive hard stop, while also eliminating the possibility of locking up after contact with the stake.

The hard stop feature provides no increase to stroke loads and eliminates increased breakaway forces, as well as provides high load carrying capability. Additionally, in the disclosed embodiments there is no plastic on the spline to deform, any possible deformation on the male spline does not increase loads because the metal tooth profile is well within the metal tooth profile of the female shaft 12.

The embodiments disclosed herein feature a new stake process that avoids deformation of a splined portion of the female shaft 14 and the ability to withstand high pull apart forces, while maintaining a low collapse breakaway load. The stake profile is formed in one axial motion. The process requires the female tube 14 wall thickness to be reduced at the staking area. By having a reduced tube thickness at the stake region, the female tube roundness deformation is minimized while improving tool life of the anti-pull apart feature forming tool. This anti-pull apart feature provides a positive hard stop while minimizing the possibility of locking up.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only

Having thus described the invention, it is claimed:

1. A steering shaft assembly comprising:
a male shaft having a plurality of teeth extending radially outwardly from a portion of the male shaft; and
a female shaft receiving a portion of the male shaft and fixed to the male shaft in a rotational direction, the male shaft axially moveable relative to the female shaft, the female shaft having an end portion and a body portion, wherein the end portion of the female shaft has an end wall thickness that is less than a body wall thickness of the body portion, the end portion curved radially inwardly to define a hard stop position during axial movement of the male shaft, wherein a portion of the end portion of the female shaft is curved beyond perpendicular to form an acute angle with the body portion of the female shaft;
wherein the teeth are overmolded with a plastic material, an end of the overmolded plastic material at an end of the plurality of teeth of the male shaft contacting the curved end portion of the female shaft at the hard stop position.

2. The steering shaft assembly of claim 1, wherein the overmolded plastic material extends over an entirety of the plurality of teeth.

3. The steering shaft assembly of claim 1, wherein the curved end portion of the female shaft includes a portion oriented perpendicular to the body portion of the female shaft.

4. The steering shaft assembly of claim 1, wherein the curved end portion of the female shaft includes a portion oriented at an acute angle relative to the body portion of the female shaft.

5. A steering shaft assembly comprising:
a male shaft having a plurality of teeth extending radially outwardly from a portion of the male shaft; and
a female shaft receiving a portion of the male shaft and fixed to the male shaft in a rotational direction, the male shaft axially moveable relative to the female shaft, the female shaft having an end portion and a body portion, wherein the end portion of the female shaft has an end wall thickness that is less than a body wall thickness of the body portion, the end portion curved radially inwardly to define a hard stop position during axial movement of the male shaft, a portion of the end portion of the female shaft is curved beyond perpendicular to form an acute angle with the body portion of the female shaft;
wherein an end of the plurality of teeth are non-overmolded and formed of metal, an end of the plurality of teeth of the male shaft contacting the curved end portion of the female shaft at the hard stop position.

6. The steering shaft assembly of claim 5, wherein a portion of the plurality of teeth of the male shaft are overmolded with a plastic material.

7. The steering shaft assembly of claim 6, wherein the non-overmolded portion and the overmolded portion of the plurality of teeth are separated by a tooth recess.

8. The steering shaft assembly of claim 1, wherein the curved end portion of the female shaft is formed with a rolling process.

* * * * *